United States Patent [19]
Fuchs et al.

[11] Patent Number: 5,718,150
[45] Date of Patent: Feb. 17, 1998

[54] GEARSHIFT DEVICE FOR THE CHANGE-SPEED GEARBOX OF A MOTOR VEHICLE

[75] Inventors: Anton Fuchs, Bayreuth; Ralf Schultheiss, Antweiler, both of Germany

[73] Assignee: Ford Global Technologies, Inc., Dearborn, Mich.

[21] Appl. No.: 665,270

[22] Filed: Jun. 17, 1996

[30] Foreign Application Priority Data

Jun. 20, 1995 [DE] Germany .............. 195 24 073.1

[51] Int. Cl.⁶ ............................................ F16H 63/36
[52] U.S. Cl. .................................. 74/477; 74/473 R
[58] Field of Search .............................. 74/473 R, 477

[56] References Cited

U.S. PATENT DOCUMENTS

| | | | |
|---|---|---|---|
| 1,946,750 | 2/1934 | Matthews | 74/477 X |
| 2,320,454 | 6/1943 | Eberhard | 74/477 |
| 4,344,334 | 8/1982 | Schmittbetz et al. | 74/473 R |
| 4,430,904 | 2/1984 | Fogelberg | 74/477 X |
| 4,666,023 | 5/1987 | Achberger et al. | 192/4 A |

FOREIGN PATENT DOCUMENTS

| | | |
|---|---|---|
| 31 47 782 | 8/1984 | Germany . |
| 39 13 269 | 2/1991 | Germany . |

*Primary Examiner*—Allan D. Herrmann
*Attorney, Agent, or Firm*—James J. Dottavio

[57] ABSTRACT

A gearshift device for the change-speed gearbox in a motor vehicle comprises a shift fork with a radially projecting selector arm having a selector groove provided therein. A selector shaft carries a radially projecting selector finger. The selector shaft is pivotable to align the selector finger to the selector arm of the shift fork. The selector finger is axially slidable to move the shift fork. A housing is arranged about the selector shaft A shifting guide is fixed to the housing. A pair of blocking teeth are provided on the shifting guide. The teeth are mutually arranged adjacent the selector arm to prevent axial movement of the selector finger when the finger is not radially aligned between the teeth.

5 Claims, 2 Drawing Sheets

GEARSHIFT DEVICE FOR THE CHANGE-SPEED GEARBOX OF A MOTOR VEHICLE

BACKGROUND OF THE INVENTION

1. FIELD OF THE INVENTION

The present invention relates to a gearshift device for the change-speed gearbox of a motor vehicle.

2. DESCRIPTION OF THE PRIOR ART

German patent 31 47 782 ('782) discloses a gearshift device for a change-speed gearbox of a motor vehicle. The device in the '782 patent comprises a selector shaft which is radially pivotable to preselect the selector gates. The shaft in the '782 patent is also axially slidable to engage gears and has fixed to it a selector finger. The selector finger cooperates with a blocking sector on a blocking device axially fixed in the housing, which pivots radially and blocks the selector arms of selector forks for the various gear ratios not selected by the selector finger. The blocking device thereby blocks axial movement thereof during an engagement movement of the selected selector arm.

This known gearshift device for change-speed gearboxes of motor vehicles has no internal selector gate, and accordingly the precision of the shifting movements is considerably impaired by the manufacturing tolerances that occur in the gearshift device.

German patent 39 13 269 ('269) discloses a similar gearshift device for change-speed gearboxes of motor vehicles. In the '269 patent, an internal selector gate is provided which cooperates with a selector pin fixed to the selector shaft to ensure improved guidance of the shifting movements. The additional selector pin needed in this gearshift device increases the cost of construction and introduces further tolerances, It would be desirable to provide an improved gearshift device for change-speed gearboxes of the kind described above so as to make available a kind of internal shifting gate that requires only a minimum of additional components.

SUMMARY OF THE INVENTION

In accordance with the present invention, an improved gearshift device for change-speed gearboxes having an internal shifting gate that requires only a minimum of additional components is provided.

The device comprises a shift fork with a radially projecting selector arm. The arm has a selector groove provided therein. A selector shaft carries a radially projecting selector finger. The selector shaft is pivotable to align the selector finger to the selector arm of the shift fork. The selector finger is axially slidable to move the shift fork.

A housing is arranged about the selector shaft. A shifting guide is fixed to the housing. A pair of wedge-shaped blocking teeth are provided on the shifting guide. The teeth are mutually arranged adjacent the selector arm to prevent axial movement of the selector finger when the finger is not radially aligned between the teeth.

By fixing in the housing a shifting guide which has wedge-shaped blocking teeth that project between mutually adjacent selector arms or are in contact with an outer selector arm of a plurality of selector forks immediately adjacent the selector grooves on the selector arms of the selector forks and cooperate directly with the selector finger on the selector shaft, with only one additional component a means for guiding the shifting movements is made available which, through its direct cooperation with the shifting finger, is affected by only a minimum of tolerances.

DESCRIPTION OF THE PREFERRED EMBODIMENTS

Figure 1:
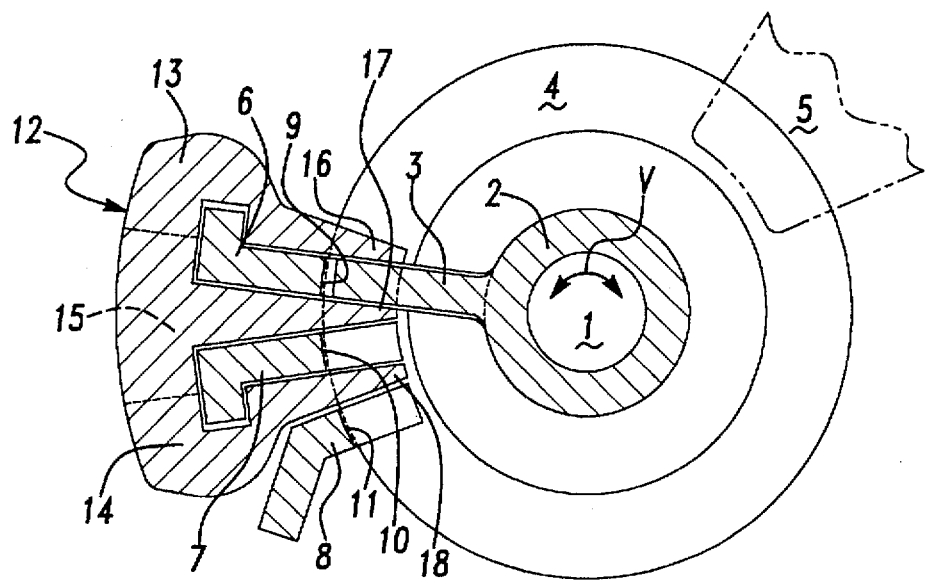
FIG. 1 is a partial cross sectional view of a gearshift selector guide according to the present invention.
Figure 2:
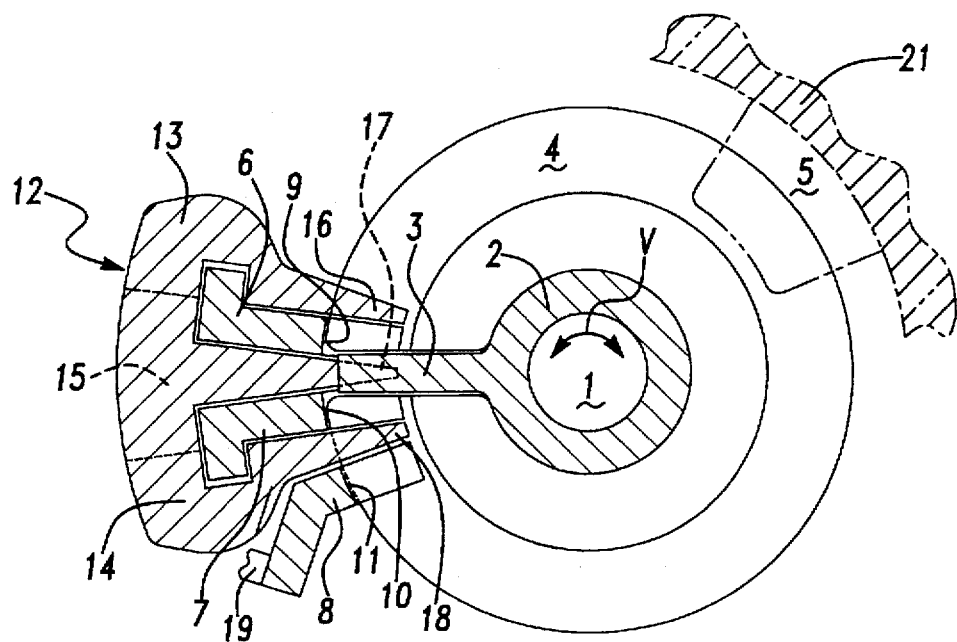
FIG. 2 is a second partial cross sectional view of the selector guide shown in FIG. 1 wherein the selector lever has been repositioned to a second position.

FIGS. 1 and 2 show a selector shaft 1 having a selector finger 3 connected to the selector shaft 1 through a selector finger hub 2. The finger 3, in a known manner, can perform a radial preselection movement indicated by the double arrow V and an axial engagement movement. During a radial preselection movement the selector finger 3 is accompanied by a blocking sector 4 of a blocking device 5 (indicated in phantom) which is arranged coaxially with the selector shaft 1 and can pivot radially together with the shaft 1 but is supported by the housing (not shown) against axial displacement. A portion of the housing 21 is illustrated in FIG. 1 adjacent the blocking device 5.

Arranged in the region of the preselection movement of the selector finger 3 are the so-called selector arms 6, 7 and 8 of corresponding selector forks, by means of which, for example, the 1st and 2nd gears, the 3rd and 4th gears and the 5th and the reverse gear can be selected. Selection grooves 9, 10, 11 are formed in the selector arms 6, 7 and 8. The selector finger 3 can enter into grooves 9, 10, and 11 to select the selector fork (not shown) connected to the respective selector arm 6, 7, 8.

When a selection groove 9 of a selector arm 6 is selected in this way by the selector finger 3, the respective other selector arms 7 and 8 are blocked by the blocking sector 4 of the blocking device 5 entering their selection grooves 10 and 11 to prevent them from being unintentionally axially displaced.

The course oh the gearshift movement, i.e. the course of the radial preselection movement with the subsequent axial engagement movement, is determined by a large number of tolerances which arise from the manufacture of the individual parts of the gearshift device, e.g. of the selector forks with the selector arms 6, 7, 8 and the selection grooves 9, 10, 11. Accordingly, attempts have been made to improve the clean course of the gearshift movement by an additional guide which comprised the prior art selection pin (not shown) mentioned above in combination with the internal shift gate. However, the exact position of the additional selection pin and the arrangement of the internal shift gate introduce new tolerances which impair the shifting movement.

According to the invention a shifting guide 12 is therefore provided which is fixed in the gearbox against radial and axial movement, but in which the fixing of the shifting guide 12 is effected as directly as possible on the components cooperating with it, namely the selector arms 6, 7 and 8 or their guide shafts (not shown). The shifting guide 12 has two guide rails 13 and 14 and a row of wedge-shaped blocking teeth 16, 17 and 18, arranged in pairs, which are formed between mutually adjacent selector arms 6, 7 or next to the outer selector arm 8. The respective blocking teeth 16, 17 and 18, arranged in pairs, allow the radial passage of the selector finger 3 and the following end edges of the blocking sector 4 of the blocking device 5. The selector guide 12 includes a bridge 15 for supporting the blocking teeth 16, 17, 18.

The shifting guide 12 according to the invention with its corresponding blocking teeth 16, 17 and 18 represents a kind of internal gate, except that this is arranged in the immediate vicinity of the selector arms 6, 7 and 8 and cooperates with the directly adjacent components as follows.

Two of the selector arms 6, 7 lie between the teeth 16, 17 of the selector guide 12 and the third selector arm 8 lies against the blocking teeth 18 from the outside. The guide rails 13, 14 of the shifting guide 12 do not accept any direct shifting forces; they only serve for safety against a possible skewing, and other forms of guide can be used in place of the guide rails.

In FIG. 1, the shifting guide 12 is shown in a position where the arm 6 of a shift fork has been selected. The parts in the plane of the selector finger 3 are shown in section. FIG. 2 shows a similar view to that of FIG. 1, but the selector guide 12 is shown rotated in a transitional position where the selector finger is not aligned to any selector arm 6, 7 and 8 of corresponding selector forks. An example of such a fork 19 is illustrated in part connected to the third shifter finger 8.

During the preselection, the blocking sector 4 of the blocking device 5 rotates with the selector finger 3 which selects a selection groove 9, 10 or 11. In the subsequent axial engagement movement, axial forces that might arise on the non-selected selector arms are absorbed through the blocking sector 4 on the axially fixed blocking device 5. This is the case, for example, if, as shown in FIG. 2, the selector finger 3 has not yet moved completely into the selection groove 9, 10, 11 of the next selector arm 6, 7, 8 and the driver of the vehicle is nevertheless already applying a shifting force, i.e. a force acting in the axial direction.

Figure 3:
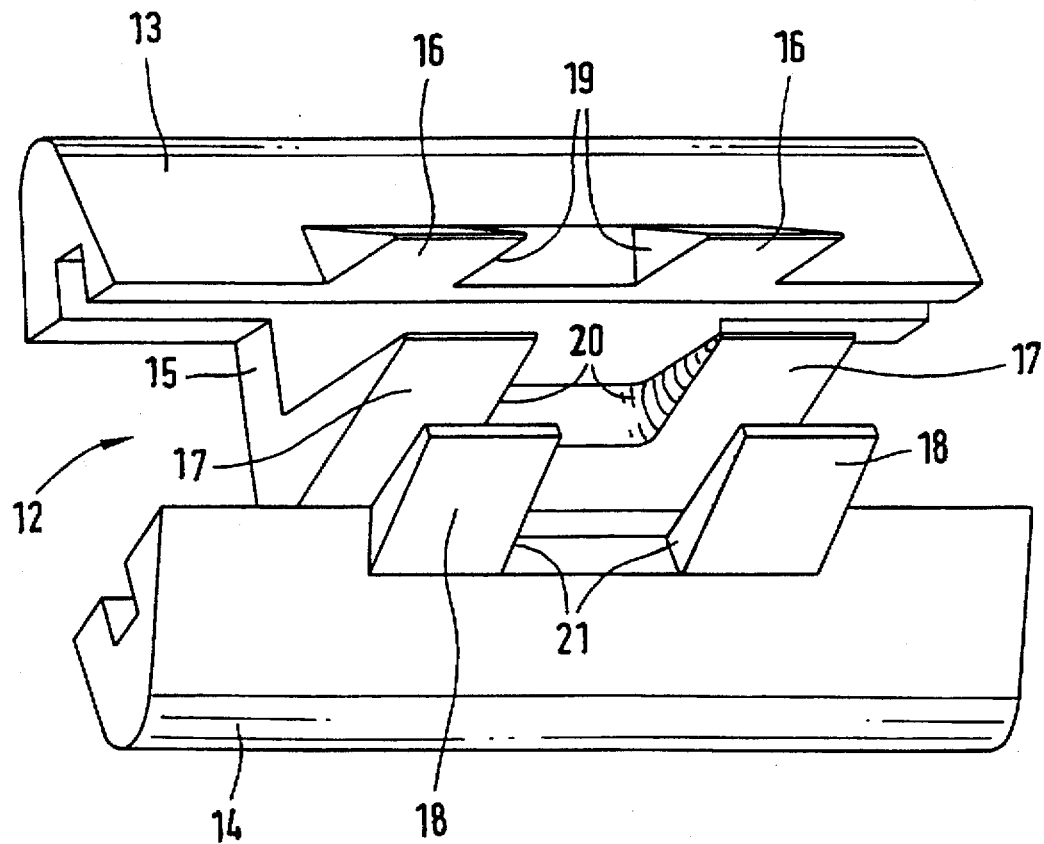
FIG. 3 is a perspective view of the selector guide shown in FIG. 1.

For the above-mentioned situation, the shifting guide 12 of the invention also offers the crucial possibility of improvement of a so-called cross-shift function, if the respective inner regions of the selector teeth 16, 17 and 18 are correspondingly rounded off. FIG. 3 illustrates an embodiment where the right-hand tooth 17 is provided with transitional surfaces 20, shown by hatching, for providing the so-called cross-shift. Thus in the case of an axial shifting movement of the selector finger 3, where the finger 3 slips past on the inner contours 20 of the blocking teeth 16, 17 and 18, and in the case of intermediate positioning the force is transmitted from the selector finger 3 to the blocking tooth 17 (left) from the blocking tooth 18 (right) to the blocking sector 4 of the blocking device 5 and from sector 4 to the gearbox housing (not shown).

This relatively short force transmission chain brings the advantage of a high stiffness for the shift feeling and at the same time a low susceptibility to tolerances due to the few components involved in the chain. Thus, through a corresponding contouring of the inner sides 19, 20, 21 of the blocking teeth 16, 17 and 18, respectively the so-called cross-shift function can be promoted, which, as a result of the short force transmission chain, leads to a clean and precise shift feeling.

Although the preferred embodiments of the present invention have been disclosed, various changes and modifications may be made without departing from the scope of the invention as set forth in the appended claims.

What is claimed is:

1. A Gearshift device for a change-speed gearbox of a motor vehicle, comprising:

a shift fork having a radially projecting selector arm with a selector groove therein;

a selector shaft carrying a selector finger radially projecting therefrom, said selector shaft being rotatably pivotable to align the selector finger to the selector arm of the shift fork, the selector finger being axially slidable to move said shift fork;

a housing arranged about the selector shaft; and a shifting guide fixed to said housing, said shifting guide including a pair of blocking teeth, said teeth being mutually arranged adjacent the selector arm to prevent axial movement of the selector finger when the finger is not radially aligned between said teeth.

2. The gearshift device according to claim 1, further comprising:

a blocking device axially fixed relative to the housing, the device being radially pivotable relative to the housing; and a blocking sector carried by said blocking device rotatable within the groove of the selector arm to block axial movement of the selector arm when said selector finger is not aligned with said selector arm.

3. A gearshift device for a change-speed gearbox of a motor vehicle, comprising:

a shift fork having a radially projecting selector arm with a selector groove therein;

a selector shaft carrying a selector finger radially projecting therefrom, said selector shaft being rotatably pivotable to align the selector finger to the selector arm of the shift fork, the selector finger being axially slidable to move said shift fork;

a housing arranged about the selector shaft;

a shifting guide fixed to said housing, said shifting guide including a pair of blocking teeth, said teeth being mutually arranged adjacent the selector arm to prevent axial movement of the selector finger when the finger is not radially aligned between said teeth, one of said teeth having an internal contour for permitting radial movement of said selector finger when said finger is axially aligned with the contour on said one of said teeth;

a blocking device axially fixed relative to the housing, the device being radially pivotable relative to the housing; and a blocking sector carried by said blocking device rotatable within the groove of the selector arm to block axial movement of the selector arm when said selector finger is not aligned with said selector arm.

4. The gearshift device according to claim 3, wherein the contour on one of said teeth lies in the plane of the selector groove.

5. The gearshift device according to claim 4, wherein the shifting guide further comprises a pair of guide rails and a bridge connected to each of the guide rails, thereby fixing the shifting guide relative to the selector arm.

* * * * *